March 25, 1969 A. W. CARLSON ET AL 3,434,697

MIXING MACHINE

Filed July 12, 1967

INVENTORS:
ARTHUR W. CARLSON
RALPH J. CARLSON

BY: *B. Dem Carlson*

ATTORNEY

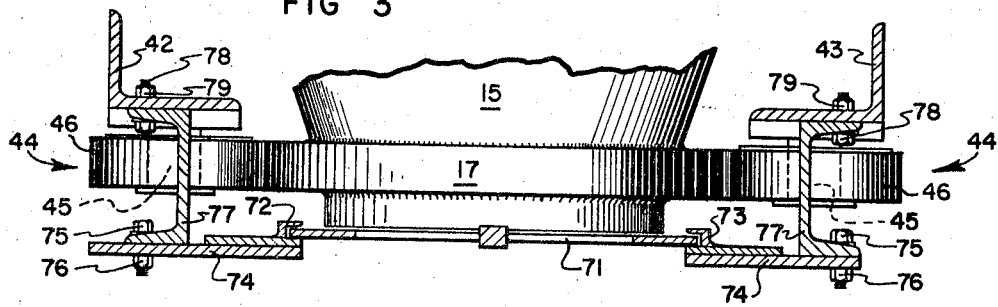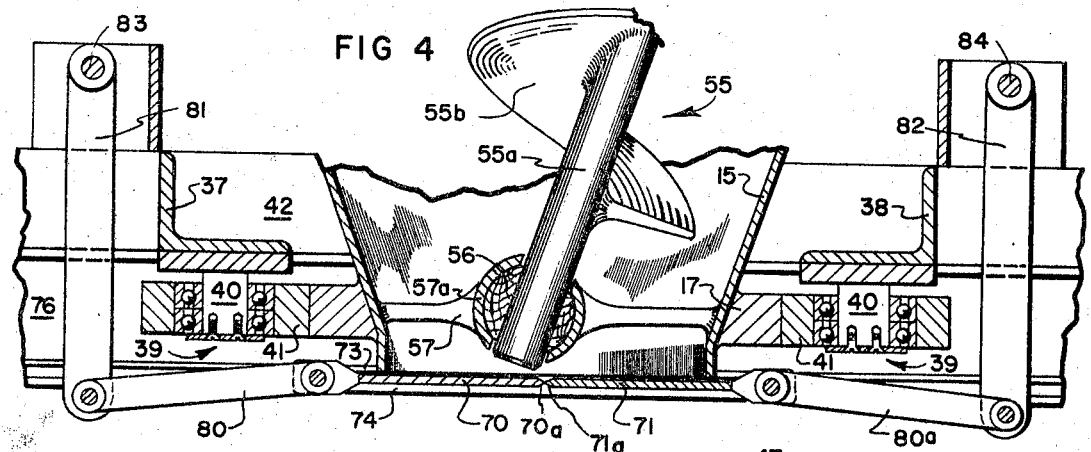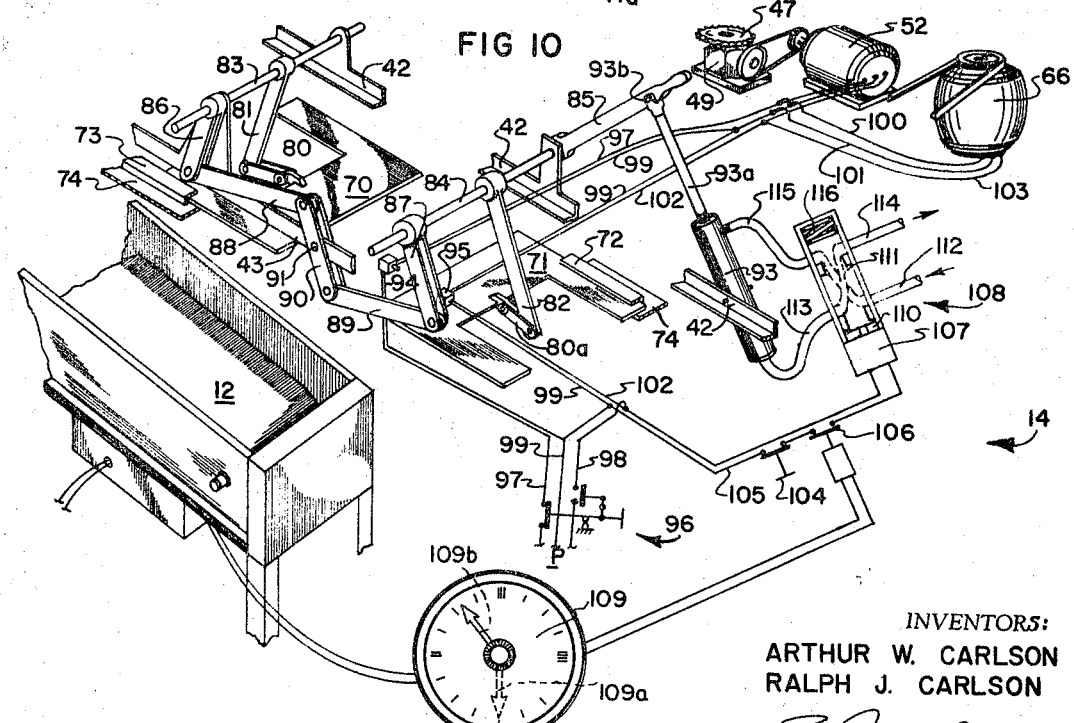

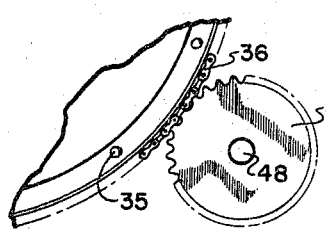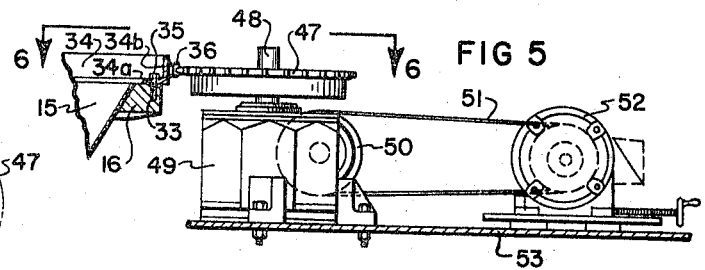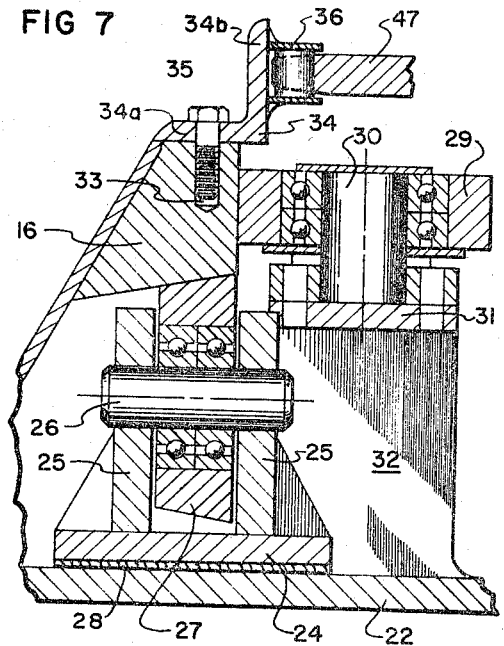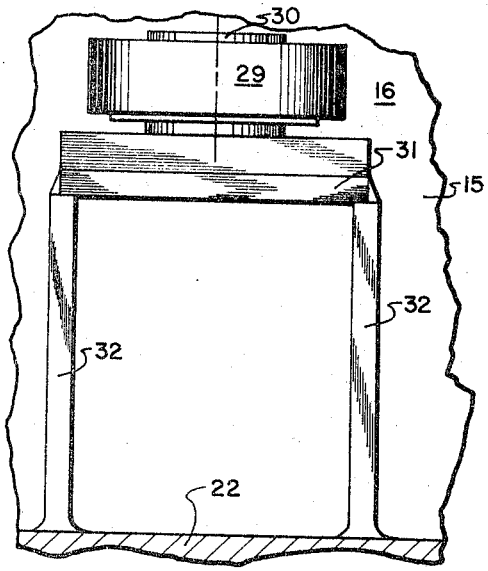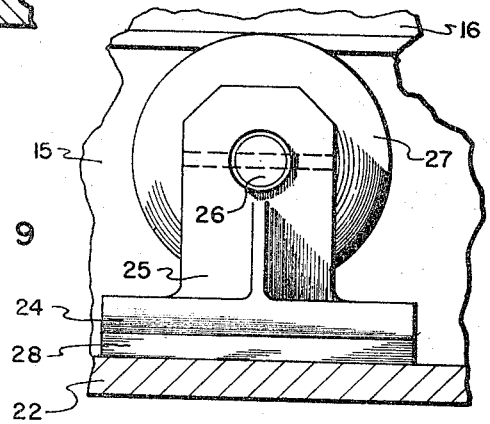

3,434,697
MIXING MACHINE

Arthur W. Carlson and Ralph J. Carlson, Salt Lake City, Utah, assignors to A & R Meats, Inc., Murray, Utah, a corporation of Utah
Filed July 12, 1967, Ser. No. 652,908
Int. Cl. B01f 15/04, 15/02, 9/08
U.S. Cl. 259—3                16 Claims

ABSTRACT OF THE DISCLOSURE

A machine for mixing meat and the like, having an inverted, truncated cone shaped, mixing vessel, open at its large top to receive material to be mixed, and a valve at the small bottom controlling discharge of the mixed material from the vessel. The mixing vessel is slowly turned around its center axis and an auger extending substantially the length of the inner wall and positioned close to the wall is journaled in a bearing that is mounted for universal rotation in a spider housing at the bottom of the vessel and is driven to revolve about its longitudinal axis. When the vessel and the auger are respectively rotated in one direction about their central axes the auger forces material in the vessel upwardly and away from the side of the vessel with the product being mixed thereafter tumbling to the center to continue its mixing action as it moves downwardly. The rotations of the vessel and of the auger are reversed upon opening of the valve and will force a pre-set amount of the mixed material downwardly through the valve before the valve is automatically closed and the rotations of the vessel and the auger are again reversed.

Brief description

Figure 1:
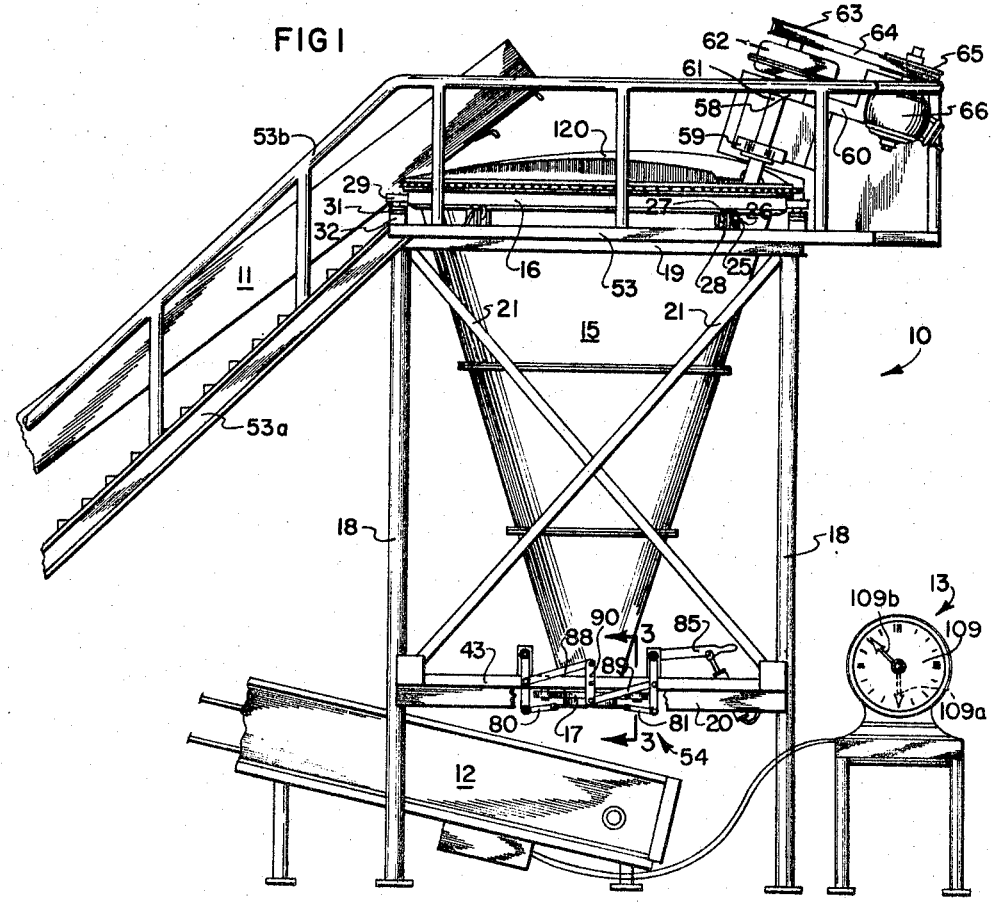

This invention relates to mixing machines and is particularly concerned with machines for mixing large volumes of meats and the like.

In the past, machines have been developed for mixing meat, and the like, but, because of their construction costs, the expenses involved in operating and maintaining them, the difficulty encountered in cleaning them and their failure to efficiently and thoroughly mix meat placed in them, they have not been entirely satisfactory. One type machine with which I am familiar is of trough shape, with a paddle assembly therein to mix the meat and to push it from a receiving end to a discharge end. In a typical installation of this type of machine, where the trough is made large enough to hold 10,000 pounds of meat, a fifty horsepower electric motor is required to turn the paddle assembly.

While under certain conditions of temperature and meat composition, this known machine may do a satisfactory job of mixing meat to make sausage or the like, it does not always perform satisfactorily if the temperature of the meat or the consistency of the meat put through is other than ideal. Frozen meat, for example, may stick to the trough and not be mixed, or, if the meat is low in fat content and becomes so sticky that it sticks to the wall of the trough and to the paddle assembly, it may not be thoroughly mixed. Strands of meat cling to the trough and to the paddle assembly and are difficult to clean.

Another mixing machine with which I am familiar uses an inverted cone shaped vessel open at its large top to receive material to be mixed and with an opening through the side wall, at the smaller, lower end, through which mixed material is discharged. The vessel is stationary and an arm positioned thereabove, swings an axially turning auger around the inside of the wall. While this machine has been used, apparently successfully, to mix dry granulated materials, so far as I am aware it has not been used for mixing meat. This is apparently due to the large power source required to swing the arm and move the auger through material having the characteristics of meat and the difficulty in fully cleaning such a machine and also, because the swinging arm is located in the vessel, material cannot be mixed in the larger upper end of the vessel, which could otherwise hold the largest quantity per unit of height, and maximum use is not made of the mixing vessel.

A principal object of the present invention is to provide an efficient and relatively simple and low cost machine for effectively mixing meat which is of a complex nature, varying in handling requirements in accordance with the conditions under which it is handled and its current physical and chemical characteristics. Meat, for example, may be ground or chopped, frozen or fresh, warm or cold, or high in either fat or lean content and each of these variables will affect mixing requirements; other objects are to provide such a machine that can be easily cleaned and maintained; and one that will discharge mixed material in any desired quantity.

It is also an object to provide a mixing machine including means for automatically reversing the direction of rotation of the mixing vessel and the auger to thereby positively discharge meat from the vessel when the valve is opened, to automatically close the valve when a preset amount of material has been discharged, and to reverse the rotations of the vessel and auger back to their mixing directions when the valve is closed.

A further object is to provide a valve that will completely close, or that will, when fully open, be completely out of the path of material being discharged, so that it does not get fouled by material discharged from the mixing vessel, and one that will effectively and completely close, even while the material is still being discharged from the mixing vessel.

Outstanding features of the invention include an inverted, truncated cone shaped mixing vessel that is open at its flared or large top to receive meat or other such material, and that has a discharge valve controlling discharge of meat funnelled through its small, lower, end by a discharge valve. The entire mixing vessel is mounted to be rotated and an auger is fixed inside the vessel, with its axis parallel to the inside wall of the vessel. The auger is axially rotated to either raise material in the vessel when the valve is closed, or to force it downwardly through the valve when the valve is opened.

Reversible motors drive the mixing vessel and the auger and are each controlled by a switch arranged to be contacted by an operating lever of the discharge valve. When the lever is moved to open the valve the switch regulates the motors such that they drive the vessel and the auger to discharge material downwardly through the valve. However, when the lever is moved to its position wherein the valve is closed, the motors drive the vessel and the auger to mix material in the vessel.

A weighing conveyor receives material from the mixing vessel and, after an amount of material determined by the setting of a control unit has been discharged onto the conveyor, a fluid cylinder is automatically actuated to close the discharge valve. As the discharge valve closes, the reversible motors are actuated to again drive the vessel and the auger such that the material is mixed.

Additional objects and features of the invention will become apparent from the following detailed description and drawings, disclosing what is presently contemplated as being the best mode of the invention.

The drawings

Figure 2:
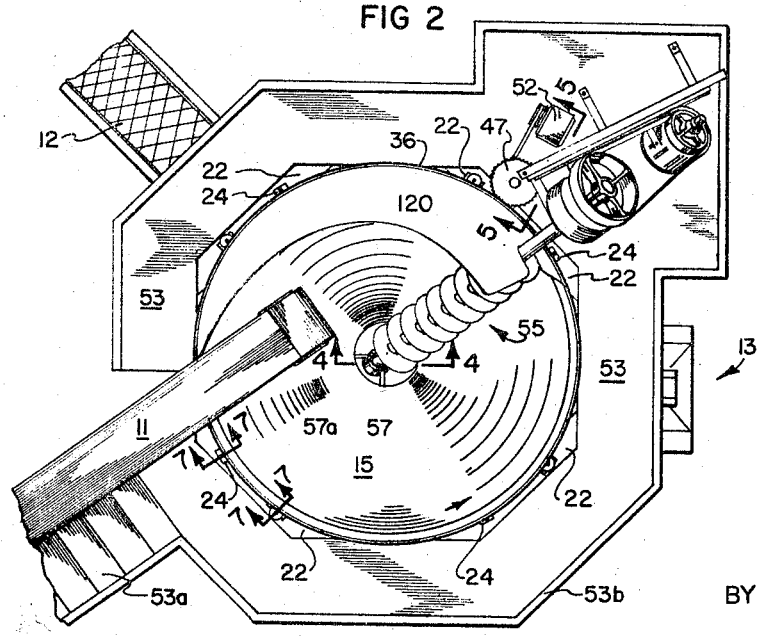

FIG. 1 is a front elevation view, in somewhat schematic form of the invention;

FIG. 2, a top plan view;

FIG. 3, an enlarged, fragmentary vertical section taken on the line 3—3 of FIG. 1;

FIG. 4, a vertical section drawn to a still larger scale, and taken on the line 4—4 of FIG. 2;

FIG. 5, an enlarged, fragmentary vertical section taken on the line 5—5 of FIG. 2;

FIG. 6, a still larger fragmentary top plan view, taken on the line 6—6 of FIG. 5;

FIG. 7, an enlarged, fragmentary view of the upper supporting and centering rollers, taken on the lines 7—7 of FIG. 2;

FIG. 8, an enlarged view of a top centering roller;

FIG. 9, a similar view of a supporting roller; and

FIG. 10, a schematic circuit diagram, showing the motor controls and the controls for the discharge valve.

Detailed description

Referring now to the drawings:

In the illustrated preferred embodiment, the invention includes a mixer, shown generally at 10; a conveyor 11 for supplying meat or other such material to the mixer; a conveyor 12 to receive material discharged from the bottom of the mixer; a control unit 13 connected to the conveyor; and an electrical and pneumatic circuit, shown generally at 14, FIG. 10, for controlling the mixing vessel and auger motors and a mixer discharge valve, in a manner to be fully explained.

The mixer 10 includes an inverted, truncated cone shaped mixing vessel 15 that has a flange 16 surrounding its large, flared, upper end and a flange 17 surrounding its small bottom end.

A frame including legs 18, interconnected by upper and lower crossbars 19, and 20, respectively, and diagonal braces 21, surrounds the vessel.

Cross braces 22, FIGS. 2 and 7, extend between adjacent upper crossbars 19 and below the flange 16. Each cross brace has a plate 24 thereon with spaced upstanding brackets 25 supporting a horizontal shaft 26 on which a bevelled roller 27 is mounted. Flange 16 rests on the bevelled rollers 27 and the rollers support the vessel 15 as well as holding it centered between them. Obviously, additional support rollers could be used, if so desired. Shims 28 can be used between each plate 24 and cross brace 22 to change the elevation of the bevelled rollers 27, as required for proper support.

In addition, centering rollers 29 are journaled on vertical shafts 30 and are positioned to contact the outer periphery of flange 16 to further stabilize and prevent undesired lateral movement of the vessel 15 as it is turned. As illustrated, the shafts 30 extend upwardly from plates 31 that bridge upstanding plates 32 on the cross braces 22. One roller is positioned on each crossbrace, but more could as well be used.

Flange 16 has spaced and tapped holes 33 formed in its top surface and an angle ring 34 has one leg 34a resting on the flange 16 and bolted thereto by bolts 35 threaded into the holes 33. Another leg 34b extends upwardly from the flange 16 and has a drive chain 36 welded thereto.

Braces 37 and 38, FIG. 4, extend between lower crossbars 20 on opposite sides of the lower end of vessel 15 and each support a suspended roller assembly 39 that has a vertical axis 40, about which a roller 41 is journaled.

Braces 42 and 43, on opposite sides of the lower end of vessel 15, interconnect the braces 37 and 38 and each support a suspended roller assembly 44, having a vertical axis 45 about which a roller 46 is journaled. Rollers 41 and 46 are arranged to engage the outer periphery of flange 17, surrounding the lower end of the vessel, to thereby stabilize the lower end of the vessel and assist in preventing lateral movement of the vessel.

Chain 36 is fixed to the upright leg 34b of ring 34 on flange 16 and is arranged to be in meshing engagement with a sprocket 47 mounted on an upright output shaft 48, protruding from a conventional gear reduction unit 49. A pulley 50, on the input shaft of the gear reduction unit 49, is driven through a belt 51 and a motor 52. The motor is preferably mounted on a walkway deck 53 that surrounds the vessel 15 and that is carried by upper crossbars 19. Thus, as motor 52 is driven, sprocket 47 is turned to rotate the vessel 15. Motor 52 is preferably reversible, so that vessel 15 will turn in one direction during mixing, with the direction of rotation being reversed when meat is being discharged therefrom through a discharge control valve, shown generally at 54. A stairway 53a is connected to the walkway 53 and forms an additional reinforcement for the frame. Also, a hand rail 53b is preferably provided on at least one side of stairway 53a and around walkway 53, to insure safety of operators, etc.

An auger 55 is mounted inside vessel 15, with its center shaft 55a, FIG. 4, parallel to the inside wall of the vessel and its flights 55b very close to the wall. The lowermost end of the center shaft is journaled in a spherical bearing 56, FIG. 4, that is carried by a center housing 57a of a spider 57 at the bottom of the vessel. Other materials may be satisfactory, but experience has shown that if bearing 56 is made of oil impregnated hardwood, it will allow the auger to turn and the bearing housing 57a to universally swivel as the vessel 15 is rotated, while still providing a long, useful life, substantially free of wear.

The upper end of the centre shaft 55a is journaled through bearings 58 and 59 carried by a motor-support framework 60 mounted on walkway deck 53 and is connected to the output shaft 61 of a conventional gear reduction unit 62, also carried by motor-support framework 60. The input shaft of the gear reduction unit 62 has a pulley 63 fixed thereon and a belt 64, drivingly interconnecting the pulley 63 and a pulley 65 of a reversible motor 66, transmits driving force from the motor, to the auger 55, through the gear reduction unit 62. Motor 66 and auger 55 are driven in one direction for the mixing of meat in vessel 15 and are turned in the opposite direction as meat is discharged through control valve 54, as will be more fully explained. Motors 52 and 66 are both preferably mounted so that they can be moved, as necessary to maintain desired tension on the belts 51 and 64, but this mounting means is not shown in detail since it is well known. Power to the motors is supplied from a conventional source P, through a three-phase electrical circuit that includes switches, to be described.

Discharge control valve 54 includes a pair of sliding plates 70 and 71, guided for reciprocating movement beneath the lowermost end of vessel 15 by angles 72 and 73 that are fixed to support plates 74. Support plates 74 are attached by bolts 75 and nuts 76 to channel members 77 that are suspended from braces 42 and 43 by bolts 78 and nuts 79.

The sliding plates are reciprocated in the guideways formed between angles 72 and 73 and their associated support plates 74 by a mechanical linkage comprising links 80 and 80a, pivotally connected at one end to the rear of sliding plates 70 and 71, respectively, and at their other ends to ends of arms 81 and 82. The other ends of arms 81 and 82 are secured to shafts 83 and 84, respectively, that are each journaled through both of the braces 42 and 43. Shaft 84 protrudes through brace 42 and has a handle 85 affixed thereto such that rotation of the handle will turn the shaft. The sliding plates are easily removed for cleaning simply by removing the pivot pins connecting links 80 and 80a to them and then sliding them from the guideways.

Another arm 86 is fixed to shaft 83 and a similar arm 87 is fixed to shaft 84. Arms 86 and 87 are respectively connected to links 88 and 89 that are also pivotally connected to opposite ends of a member 90 that is pivotally mounted at its center 91 to brace 43.

Arranged as shown and described, clockwise turning of handle 85 will rotate the shaft 84 to which it is attached and its arm 82 to move sliding plate 71 beneath the bottom of vessel 15, while at the same time arm 87 and link 89 are pivoting member 90 about center 91 to move link 88 and pivot arm 86 to rotate shaft 83. This rotates arm 81 and moves sliding plate 70 beneath the bottom of vessel 15 to abut plate 71.

The sliding plates 70 and 71 are provided with bevelled edges 70a and 71a, respectively to slice through any product being discharged when they are closed. Since the sliding plates are arranged to slide just below the small end of vessel 15, they effectively close the discharge opening when they are moved together.

Counterclockwise rotation of handle 85 will, through an opposite action of the mechanical linkage, move the plates 70 and 71 to their open position, wherein the bottom opening from vessel 15 is completely unobstructed.

While the discharge control valve can be arranged to be completely manually operated, it is preferred that the valve be automatically closed after a predetermined amount of the meat or other mixed product has been discharged. For this purpose a pneumatic cylinder 93 is mounted on brace 42 and the cylinder rod 93a is pivotally connected at 93b to the handle 85. Retraction of rod 93a into the cylinder housing will pivot handle 85 clockwise and will move sliding plates 70 and 71 toward each other in the manner previously described.

When the sliding plates reach their fully closed positions, arm 87 contacts a microswitch 94 that is mounted on brace 43, and when the sliding plates are in their fully open position arm 87 contacts a microswitch 95, similarly mounted on brace 43.

In operation, assuming that the sliding plates 70 and 71 are in their fully closed position and arm 87 has contacted microswitch 94 to complete the circuit therethrough, switch 96 is actuated to close the circuit through line 97 and to open the circuit through line 98 of a 220 volt supply circuit made up of lines 97, 98 and 99.

A complete circuit is thus provided through lines 97 and 99 and switch 94 to drive motor 52 and the mixing vessel and, through lines 100 and 101, connected to lines 97 and 99 respectively, the motor 66 and auger 55, in their mixing direction.

After the material in the mixing vessel 15 has been sufficiently mixed, the operator will operate switch 96 to stop the motors 52 and 66. This also closes the circuit through line 98, but, there will be no complete circuit through line 99 and through line 102, connected to line 98 since arm 87 will not yet be contacting and closing switch 95 in lines 99 and 102, and motors 52 and 66 will not be driven in their reverse or discharge direction. Line 103 connects line 102 and motor 66, so that the motors will be driven together in their discharge directions.

To start discharge of material from vessel 15, the operator moves manual switch 104 in line 105 to the position shown, to complete a circuit through line 99, switch 104, normally closed, solenoid controlled switch 106, solenoid 107 of valve 108 and line 98 that is connected to the switch 96. The solenoid 107 is energized and its rod 110 is expelled to move the valve spool 111 to place pressure inlet 112 of the valve in communication with line 113, connected to the rear of the cylinder housing and to place exhaust outlet 114 of the valve in communication with line 115, connected to the front of the cylinder housing.

Pressure supplied to the rear of cylinder 93 expels rod 93a and pivots handle 85 to open the sliding plates 70 and 71, in the manner previously described, and also moves arm 87 to contact and close switch 95. This completes the circuit necessary to drive motors 52 and 66 in their reverse or discharge directions and the auger will force meat or other such material being mixed downwardly through the discharge valve and onto weighing conveyor 12.

After the predetermined weight of meat, as set by control unit 13, has been deposited on conveyor 12, pointer 109b completes a circuit through the solenoid switch 106 to open the switch and break the circuit to solenoid 107. Spring 116 then biases spool 111 to place pressure inlet 112 of the valve in communication with line 115 and exhaust outlet 114 in communication with line 113. This retracts piston rod 93a to close the sliding plates 70 and 71, as has been heretofore described.

As soon as arm 87 is moved away from microswitch 95, motors 52 and 66 stop and there will be no further rotation of vessel 15 or auger 55, even though arm 87 contacts microswitch 94, until switch 96 is again actuated to close line 97 and to operate the motors to drive the vessel and auger in their mixing direction, or until switch 104 is again actuated to close line 105 and operate solenoid 107 and valve 108 to move handle 85 and arm 87 such that a complete circuit is established to drive the motors in their reverse or discharge directions.

In the usual cycle of operation, discharge control valve 54 is initially closed and meat or other such material to be mixed is fed into the vessel 15 as its top, via conveyor 11.

Switch 96 is actuated and vessel 15 and auger 55 are rotated in the mixing direction until the product is thoroughly mixed. During the mixing, the product is constantly being moved to the top of the mixer by the auger and falls back toward the bottom of the vessel. A deflector 120, supported by cross braces 22, preferably extends partially over the top of vessel 15 and from above the auger 55 partially around the periphery of the vessel in the direction of rotation of the vessel during mixing. The deflector prevents any meat being forced over the top of vessel 15 by auger 55 and, if necessary, directs meat raised by the auger back down into the vessel. Deflector 120 is not necessary, however, if the vessel 15 and auger 55 are driven at proper relative speeds, since the rotating vessel will be sufficient to carry the meat away from the auger.

The operator sets pointer 109a of dial 109, forming part of control unit 13, to a figure representing a desired batch, by weight, of meat to be deposited on conveyor 12 and then, after the meat has been fully mixed operates switch 96 to stop the motors. Thereafter he operates switch 104 to rotate handle 85 and to open the control valve 54. The motors 52 and 66 will start again after the valve 54 is fully opened and the directions of rotation of vessel 15 and auger 55 will be reversed such that the vessel will feed the auger which will then push the meat down through the open bottom end of the vessel 15.

After the predetermined amount of meat has been deposited on the conveyor, pointer 109b breaks a beam of light and a circuit is established to open solenoid valve 106, thereby allowing cylinder rod 93a to be retracted, the motors 52 and 66 to stop and the sliding plates 70 and 71 to close, all in the manner previously described. Any suitable control unit can be used, but an electric photo cell equipped Fairbanks Morse unit connected to a Fairbanks Morse scale on the weighing conveyor, all in conventional fashion has been found to be very suitable.

With the present invention a mixing vessel large enough to hold and mix 10,000 pounds of meat for sausage can be turned by a three horsepower electric motor and a ten to twenty-five horsepower motor will turn the auger. The mixed material is forcefully discharged out the bottom and the mixer is, therefore, largely self-cleaning, but can be easily further cleaned since all parts are readily accessible.

Material placed in the mixing vessel is thoroughly mixed since the rotating vessel carries it to the auger, the auger mixes it as it raises it and further mixing occurs as the material falls toward the center and bottom of the vessel 15.

Although a preferred form of our invention has been hereindisclosed, it is understood that the present disclosure is made by way of example and that variations are possible without departing from the subject matter encompassed within the scope of the following claims, which subject matter I regard as my invention.

I claim:
1. A mixing machine for meat and the like, comprising
   an inverted, truncated cone shaped mixing vessel, open at its large top end to receive material to be mixed;
   a frame supporting said mixing vessel;
   a valve for controlling discharge from the small bottom end of the mixing vessel;
   means for rotating said mixing vessel, with respect to said frame and about the central vertical axis of the vessel;
   an auger;
   means fixedly mounting said auger with respect to the frame and to extend downwardly into the vessel along the interior wall thereof; and
   means for selectively rotating said auger in both directions about its longitudinal axis.

2. A mixing machine for meat and the like comprising
   an inverted, truncated cone shaped mixing vessel, open at its large top end to receive material to be mixed;
   a frame supporting said mixing vessel;
   means for rotating said mixing vessel with respect to said frame, and about the central upright axis of the vessel;
   an auger,
   means fixedly mounting said auger with respect to the frame and to extend downwardly into the vessel along the interior wall thereof;
   means for rotating said auger about its longitudinal axis; and
   a valve, carried by the frame, for controlling discharge from the bottom end of the mixing vessel, said valve including a pair of sliding plates, guide means on the frame for guiding said plates into closed positions wherein they are in abutting engagement beneath the small end of the mixing vessel and into open positions wherein they are separated and are positioned beyond the small end of the mixing vessel, and linkage means, including a handle, arranged to slide the plates into their closed positions when the handle is moved in one direction and to slide the plates to their open positions when the handle is moved in another direction.

3. A mixing machine according to claim 2, further including
   means for automatically moving the plates to their closed positions after a predetermined amount of material has discharged from the mixing vessel.

4. A mixing machine according to claim 3, wherein the means for automatically moving the plates to their closed positions includes
   a weighing conveyor positioned to receive material discharged through the valve;
   means for creating an electrical signal when a preset amount of material has been discharged onto the weighing conveyor;
   a fluid cylinder having its housing fixed to the frame and its rod connected to reciprocate the sliding plates; and
   means responsive to the electrical signal for operating the rod and thereby moving the plates into abutting engagement, closing the lower small end of the mixing vessel.

5. A mixing machine according to claim 4, further including a
   first switch positioned to be actuated by the linkage means when the plates are in their closed positions;
   a second switch positioned to be actuated by the linkage means when the plates are moved to their open positions;
   a fluid supply line, connected to a source of fluid pressure;
   a fluid exhaust line;
   a solenoid valve in the supply and exhaust lines; and
   an electrical circuit, including the first and second switches and the means for creating an electrical signal when a pre-set amount of material has been discharged onto the weighing conveyor, for operating the solenoid valve when the pre-set amount of material has been discharged onto the weighing conveyor, to thereby supply fluid to and exhaust fluid from the fluid cylinder, whereby the cylinder rod is retracted.

6. A mixing machine according to claim 5, wherein
   the means for rotating the mixing vessel and the means for rotating the auger each includes a reversible motor that can be driven in a mixing direction after the first switch has been actuated and in a discharge direction after the second switch has been actuated.

7. A mixing machine according to claim 1, wherein
   the means for rotating the mixing vessel and the means for rotating the auger each includes a reversible motor.

8. A mixing machine according to claim 7, further including
   means for automatically closing the valve after a predetermined amount of material has discharged from the mixing vessel.

9. A mixing machine according to claim 7, wherein
   the mixing vessel has a flange formed therearound; and
   support rollers carried by the frame engage the flange to support the mixing vessel.

10. A mixing vessel according to claim 9, wherein
    centering rollers carried by the frame engage the flange to prevent lateral displacement of the mixing vessel.

11. A mixing vessel according to claim 10, further including
    another flange around the lower end of the mixing vessel; and
    additional centering rollers engaging the other flange to further prevent lateral displacement of the mixing vessel.

12. A mixing vessel according to claim 10, wherein the means for rotating said mixing vessel includes
    a chain fixed to and encircling the vessel;
    a sprocket arranged to mesh with said chain and means for rotating said sprocket.

13. A mixing machine according to claim 12, wherein the valve arranged to control discharge from the small end of the mixing vessel is carried by the frame and includes
    a pair of sliding plates;
    guide means carried by the frame for guiding said plates into closed positions wherein they are in abutting engagement beneath the small end of the mixing vessel and into open positions wherein they are separated and are positioned beyond the small end of the mixing vessel; and
    linkage means, including a handle, arranged to slide the plates into their closed positions when the handle is moved in one direction and to slide the plates to their open position when the handle is rotated in the opposite direction.

14. A mixing machine according to claim 13, further including
    means for automatically moving the plates to their closed positions after a predetermined amount of material has discharged from the mixing vessel.

15. A mixing machine according to claim 14, wherein the means for moving the plates to their closed positions includes
    a weighing conveyor positioned to receive material discharged through the valve;
    means for creating an electrical signal when a preset amount of material has been discharged onto the weighing conveyor;
    a fluid cylinder having its housing fixed to the frame and its rod connected to reciprocate the sliding plates; and
    means responsive to the electrical signal for supplying pressure fluid to the cylinder housing to thereby retract the rod and move the plates into abutting engagement, closing the lower small end of the mixing vessel.

16. A mixing machine according to claim 15, further including
a first switch positioned to be actuated by the linkage means when the plates are in their closed positions whereby the reversible motors can each be driven in one direction to drive the mixing vessel and the auger, respectively, for the mixing of material in the vessel;
a second switch positioned to be actuated by the linkage means when the plates are moved to their open positions whereby the reversible motors can each be driven in an opposite direction to drive the mixing vessel and the auger, respectively, for the discharge of material from the vessel;
a fluid supply line, connected to a source of fluid pressure;
a fluid exhaust line;
a solenoid valve in the supply and exhaust lines; and
an electrical circuit, including the means for creating an electrical signal when a preset amount of material has been discharged onto the weighing conveyor, for allowing the motors to be driven in their mixing directions when the first switch is actuated, and for operating the solenoid valve after the second switch has been operated and when the preset amount of material has been discharged onto the weighing conveyor to supply fluid to and to exhaust fluid from the fluid cylinder, whereby the cylinder rod is retracted and the valve is closed.

References Cited

UNITED STATES PATENTS

| | | | |
|---|---|---|---|
| 918,749 | 4/1909 | Hommel | 259—3 |
| 2,425,942 | 8/1947 | Kooman | 259—33 |
| 3,285,578 | 11/1966 | Edwards et al. | 259—3 |
| 26,922 | 1/1860 | Potter | 259—85 |
| 2,237,859 | 4/1941 | Bille | 259—85 |

FOREIGN PATENTS 1,233,154  5/1960  France.

WALTER A. SCHEEL, *Primary Examiner.*

JOHN M. BELL, *Assistant Examiner.*

U.S. Cl. X.R.

177—112; 251—319, 326; 259—33